Sept. 27, 1966    O. KRACHT ETAL    3,275,024
CASINGS FOR VALVE ASSEMBLIES
Filed April 6, 1964    14 Sheets-Sheet 1

Fig. 1

Sept. 27, 1966    O. KRACHT ETAL    3,275,024
CASINGS FOR VALVE ASSEMBLIES
Filed April 6, 1964    14 Sheets-Sheet 2

Sept. 27, 1966   O. KRACHT ETAL   3,275,024
CASINGS FOR VALVE ASSEMBLIES
Filed April 6, 1964   14 Sheets-Sheet 5

Sept. 27, 1966   O. KRACHT ET AL   3,275,024
CASINGS FOR VALVE ASSEMBLIES
Filed April 6, 1964   14 Sheets-Sheet 7

Fig. 16

Sept. 27, 1966     O. KRACHT ETAL     3,275,024
CASINGS FOR VALVE ASSEMBLIES Filed April 6, 1964     14 Sheets-Sheet 10

Sept. 27, 1966    O. KRACHT ETAL    3,275,024
CASINGS FOR VALVE ASSEMBLIES
Filed April 6, 1964    14 Sheets-Sheet 12

Sept. 27, 1966 O. KRACHT ETAL 3,275,024
CASINGS FOR VALVE ASSEMBLIES
Filed April 6, 1964 14 Sheets-Sheet 14

United States Patent Office 3,275,024
Patented Sept. 27, 1966

3,275,024
CASINGS FOR VALVE ASSEMBLIES
Otto Kracht and Hans Schumacher, Werdohl, Germany, assignors, by mesne assignments, to Kadron G.m.b.H., a corporation of Switzerland
Filed Apr. 6, 1964, Ser. No. 357,553
Claims priority, application Germany, Apr. 11, 1963, K 49,462
14 Claims. (Cl. 137—315)

The present invention relates to valve assemblies and more particularly to casings for valve assemblies used to control fluids under pressure.

It is known in the art to put together valve assemblies of individual valve units according to the purpose for which the entire assembly is intended. These assemblies are equipped with a common inlet and a common outlet member each formed of an individual unit. The inlet member usually has a pressure limiting valve. The interconnection of the individual units, is accomplished by threading said parts together. For this reason at least, the before-mentioned type of valve assembly is expensive. Furthermore such valve assemblies are comparatively bulky.

It is also common in the art to cast casings for valve assemblies rather than connecting individual units by threaded means. Although this casting technique allows relatively small dimensions of the entire assembly, it also has the drawback that such cast casings are very heavy. Moreover, the manufacturing of such cast casings is expensive due to the complicated structure of the cores used during the casting process. It especially is a disadvantage that every different type of assembly requires different cores and patterns.

It is therefore an object of this invention to provide casings for valve assemblies that may be manufactured in an easy manner and at low cost and do not require any patterns but which may be formed by a number of different basic components, the number and the arrangement of these basic components depending on the final purpose of the assembly.

It is another object of this invention to provide a valve assembly of light weight.

It is a further object of this invention to provide a casing for a valve assembly which is absolutely pressure-tight.

It is still another object of this invention to provide casings, the dimensions of which do not exceed the dimensions of cast casings of comparable capacity.

Further objects and advantages of this invention will become apparent from the following description and the accompanying drawings, wherein:

FIGS. 3 through 5 are cross-sectional views taken along line III—III of FIG. 1, depicting three different embodiments of fittings connecting the valve assembly to adjacent containers, pipes or the like;

Figure 1:
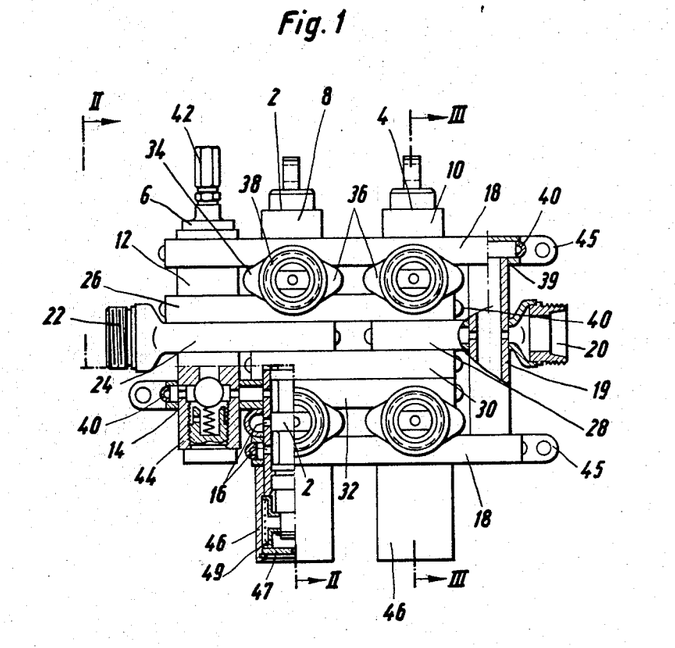
FIG. 1 is a side elevational view partly in cross-section of a valve assembly according to this invention.

Referring now to the drawings in greater detail, FIG. 1 shows a valve assembly including two adjacent valves 2 and 4 and inlet member 6. The annular area around the control bushings 8 and 10 of the valves 2 and 4 and around the bushing 12 of the inlet member 6 are defined by flat tubes the wider sides of which are even and extend in parallel relationship to each other. At their narrow sides, the flat tubes have a semicircular cross-section. The flat tubes also form passages interconnecting the bushings 8, 10 and 12. In a direction perpendicular to their flat sides, the flat tubes are provided with openings 14 which are penetrated by bushings 8, 10 and 12. Portions of the bushings extending within the flat tubes are provided with connecting bores 16 or the like which preferably are distributed uniformly around the periphery of the bushings. In the embodiment of FIG. 1, the tubes 18 serve the function of feed-back channels through which oil no longer under pressure of a hydraulic system may flow back into a tank. At the outlet side of the valve assembly, the feed-back channels 18 are connected by a tubelike manifold 19 having an outlet 20. At the inlet side of the valve assembly, there is provided an inlet member 22 through which the pressurized fluid is fed into the valve assembly. The inlet 22 is connected to the flat tube 24 which extends to the control bushing 8.

Figure 2:
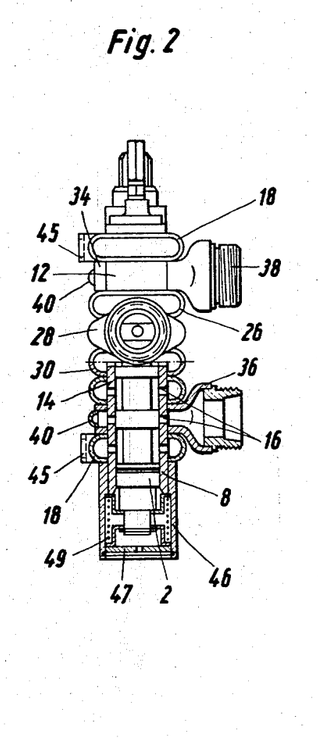
FIG. 2 is a partial cross-sectional view taken along the line II—II of FIG. 1.

Above the tube 24 a further flat tube 26, as seen in FIG. 1 in sideview and in FIG. 2 in an end view, is arranged and is penetrated by the three bushings 8, 10 and 12. Behind tube 24 and in the same direction, there extends a further flat tube 28, this tube being penetrated by the control bushing 10 and the manifold 19. This manifold 19 in the same manner as tube 18 functions as a back feeding passage. At its one end it has an outlet 20.

Below the tube sections 24 and 28 a further flat tube 30 being penetrated only by the bushings 8 and 10 is arranged. Immediately below the tube 30 a further flat tube 32 is located, which again is penetrated by all three bushings 6, 8 and 10. A pair of flat tubes 34 with their main axes perpendicular to the main axes of tubes 18 and 26 extends between the upper feedback tube 18 and tube 26. At their ends, each of the tubes 34 is provided with portions 36 of enlarged diameter into which the fittings 38 are inserted. Likewise, a similar pair of flat tubes 34 is positioned between the lower flat tube 18 and the neighboring flat tube 32. All of the last mentioned tubes 34 extend in a direction perpendicular to the flat tubes 18, 26 and are penetrated by the control bushings 8 and 10, respectively.

The manifold 19 is inserted with its two ends into corresponding apertures provided in the walls of the feedback tubes 18 such that the liquid may travel from the feedback tubes 18 into the manifold 19.

The flat tubes are closed at their ends by inserts 40 as indicated for example in FIG. 1 for the upper feedback tube 18 and in FIG. 2 for the lower tube 34.

The inlet member bushing 12 receives a pressure limiting valve 42 which is interconnected between the inlet tube 24 and the feedback tube 18. A check valve 44 is provided at the lower end of the inlet member bushing 12.

The control bushings 8 and 10 are provided at their lower ends with pot-like casings 46 which may be soldered to the control bushings. The casings 46 are closed at their lower ends by detachable plates 47. Within a casing 46, a biased spring 49 is provided as a reset means which engages the lower end of the control piston 2 mounted within bushing 8.

In order to fasten the valve assembly, tongs 45 may be soldered to one side of the feedback tubes 18, these tongs having openings through which suitable fastening means as bolts or the like may penetrate.

In manufacturing a valve assembly of the before-described type, flat tubes are cut at a proper length and are provided with the apertures required in order to receive the control bushings. The flat tubes, of course, likewise may be provided with the apertures for the bushings before the individual sections are separated. According to the invention, the outer surface as well as the inner surface of the control bushing can be formed smoothly and evenly. They are inserted into the aligned apertures of the flat tubes the flat walls of which are extending parallel to each other. Preferably, as in the embodiment shown in FIG. 1, the flat walls of adjacent tubes are contacting each other. A brazing material in form of wires or pastes is applied to the zones where the bushings have to be sealed to the flat tubes. Subsequently to these preparations, the entire assembly of control bushings and flat tubes can be heated in a furnace, possibly in the environment of a protective gas, in order to solder the individual parts to each other in a single step. In this connection it should be mentioned that it has been found advantageous if the soldering takes place in a low vacuum. In using the before-mentioned method it is sufficient for the individual parts to lie upon each other only under the influence of their own weight. In case of a risk that some of the parts to be soldered might be moved in relationship to each other, for example, the tube 19 or the fastening tongs 45, these parts can be presecured by spot welding or the like.

The valve assembly described in connection with FIGS. 1 and 2 can be a simple three way valve or four way valve. It is, of course, possible to construct valves of different control functions. There is also no limitation as to the number of control bushings or control valves. As pointed out before, according to the present invention valve assemblies for every desired purpose can be built.

Figure 3:
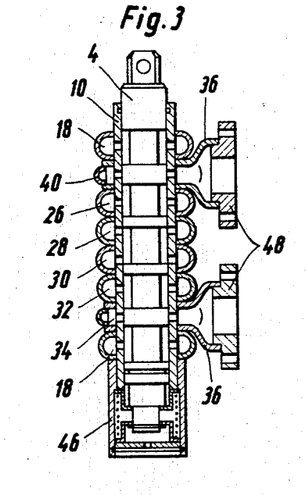
Figure 4:
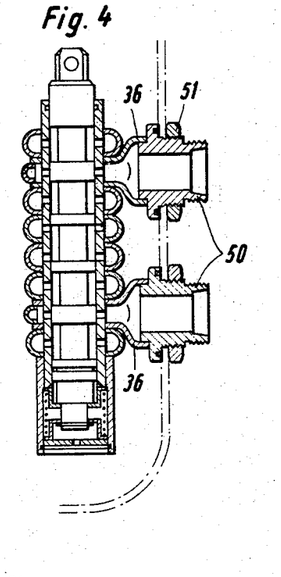
Figure 5:
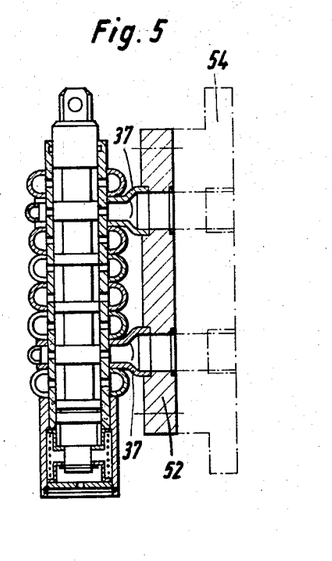

While FIGS. 1 and 2 show fittings 38 of a regular type, in the further FIGS. 3, 4, and 5 different modifications of such fittings are illustrated. In FIG. 3 fittings are shown having flanges 48 and being inserted into the ports 36 by means of shoulders whose outer diameter corresponds to the inner diameter of the ports 36. The embodiment of FIG. 4 has a fitting 50 provided with a threaded ring member 51 to secure the valve assembly in a seal-tight manner, for example to the wall of a tank (as indicated in dotted lines) or the like.

The embodiment illustrated by FIG. 5 has a connecting plate 52 into which the ports 37 of the tubes 34 are inserted, the ports 37 in this embodiment having a somewhat smaller diameter than the ports 36 of FIGS. 3 and 4. This valve assembly of FIG. 5 is secured in a conventional manner by means of the connecting plate 52 to a mounting plate 54 as indicated in dotted lines.

Figure 6:
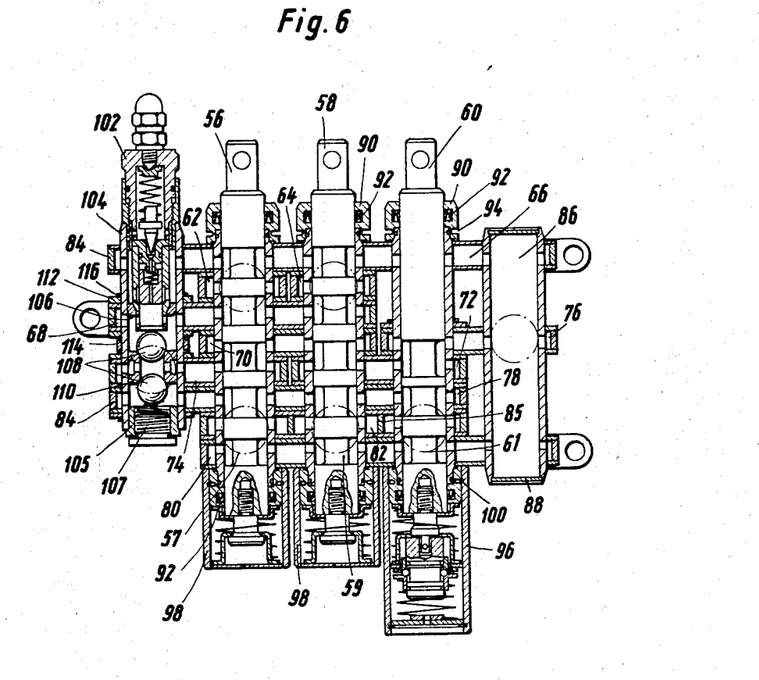
FIG. 6 is a cross-sectional view through another embodiment of this invention.
Figure 7:
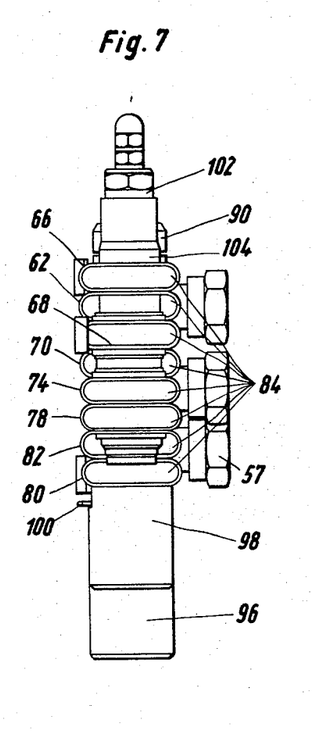
FIG. 7 is an end elevational view of the assembly of FIG. 6.

The valve assembly shown in FIG. 6 differs in structural details from the embodiment of FIGS. 1 and 2 in so far as it is provided with three parallel valves 56, 58, and 60, these valves being of a conventional type. In this case, however, the flat tubes 62, 64 serving to connect the assembly to an apparatus or device to be controlled, are formed of tube sections that extend in the same direction as the other tubes 66, 68, 70, 80, 84 being in communication with the control bushings. By this arrangement rigidity and pressure resistance of the valve assembly are still improved since neighboring tubes support each other over a length greater than in the structure of FIGS. 1 and 2.

Rather than providing individual connecting tubes 62, 64, one single continuous tube 82 having the schematically illustrated fittings 57, 59, 61 (FIG. 6) can be used, this tube 82 having inserted partitions 85 defining separated chambers each of them surrounding one of the control bushings of the valves 56, 58, or 60, respectively. It is to be understood that in the same manner also the connecting tubes 62 and 64 could be constituted by a similar continuous tube having a suitable partition.

The open ends of the flat tubes are closed by end plates 84a impressed therein. Simple punching parts may be used for this purpose.

A manifold 86 is inserted into the horizontal tubes 70, 80 and 84. The ends of manifold 86 are closed by plates 88 inserted therein and soldered thereto.

At the upper and lower ends of the control bushings of valves 56, 58, 60 are mounted equally formed annular caps 90 which at their interior side are provided with a peripheral groove 92 adapted to receive ring-like sealing members. Grooves 94 are provided at the outside adapted to receive spring washers 100 to secure additional construction parts as for example the pot-like casings or closures 96, 98. Due to this the pot-like casings 96, 98 can be formed as one piece and for example be injection-molded of plastic.

The pressure limiting valve 102 can be threaded into the inlet bushing 104 fitting tightly with its lower end into an annular seat 106 inserted into the control bushing and being soldered thereto. In the lower part of the inlet bushing 104 furthermore is provided a conventional double-acting ball check valve 108. The seats of this valve 108 are formed by a ring 110 of C-shaped cross-section. The ring members preferably are manufactured on a lathe. The ring 110 is inserted into the bushing lower part of bushing 104 and soldered thereto. To achieve a satisfactory soldering of the rings 106 and 110 it is suitable to provide these at their outer periphery with a continuous groove into which a copper wire is fitted. At the lower end of inlet bushing 104 a threaded ring 105 is inserted and soldered thereto and a closing plug 107 is screwed into this threaded ring 105. Since the parts 105, 106, 110 are secured to control bushing 104 by soldering it is possible to employ an even smooth tube for the inlet bushing and to avoid cumbersome treatment thereof.

For purposes of additionally supporting tubes being under the influence of pressure in areas also where no counteracting tube is positioned, plates 112 may be provided supporting each other by means of an intermediate ring 114. Likewise only a flat ring 116 soldered along the outer periphery of the bushing can be provided.

Figure 8:
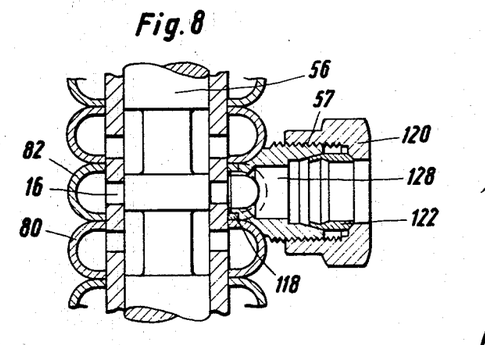
FIG. 8 is a fragmentary cross-sectional view in enlarged scale of a detail of a control bushing depicting the construction of an individual connection.
Figure 9:
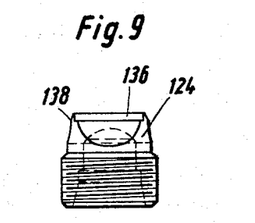
FIG. 9 is a side elevational view of the connection member of FIG. 8.
Figure 10:
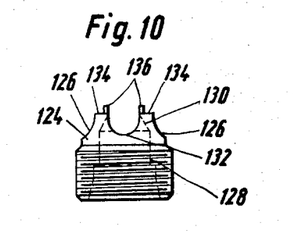
FIG. 10 is an end elevational view of the member of FIG. 9.

In the embodiment of FIG. 6 the fittings 57 etc. are inserted from a side into the semicircular shaped walls of the tubes, FIGS. 8, 9, and 10 of the accompanying drawings illustrating this in greater detail.

Cylindrical bores 118 are provided in the rounded side walls reaching as far as to the even part of the tube cross-section so that the depth of these bores corresponds at least to the length of the radius of the curved side walls of the flat tubes.

The port-adapters 119 may either, as shown in FIG. 8, be provided with a conventional fitting 120 having a cutting ring 122, or likewise with a flange or another suitable adapting element.

The port-adapters of FIGS. 8–10 have a cylindrical portion 124 with two lateral recesses 126 extending in parallel relationship. These recesses are defined by a curved surface, the curvature of this surface corresponding to the outer radius of the tubes. In the interior, the port-adapter 119 has a cylindrical bore 128 terminating a conical bore 130. At its port side end, the adapter 119 has a milled central recess 132 the bottom of which has a semi-circular cross-section and reaches within the conical bore 130. This milled recess 132 extends parallel to the recesses 126. The width of recess 132 is less than the inner distance between two opposing even faces of a flat tube. At the front end of adapter 119 further recesses 134 are provided such that lugs 136 are obtained. The distance between the outer sides of these lugs corresponds to the inner distance between a pair of opposite flat walls of a flat tube.

In order to facilitates inserting the adapters 119 the ends of the lugs 136 are lightly tapered at 138.

As apparent from FIG. 8, the faces 134 of the inserted adapter abut the bottom of bore 118, the lugs 136 fitting into the interior of the flat tube. Recesses 126, 134 and the outer surfaces of lugs 136 constitute large soldering faces and therefore and because of the fitting engagement of lugs 136 great rigidity is obtained. The described port-adapter can be manufactured by a profile cutter in a single step.

Figure 11:
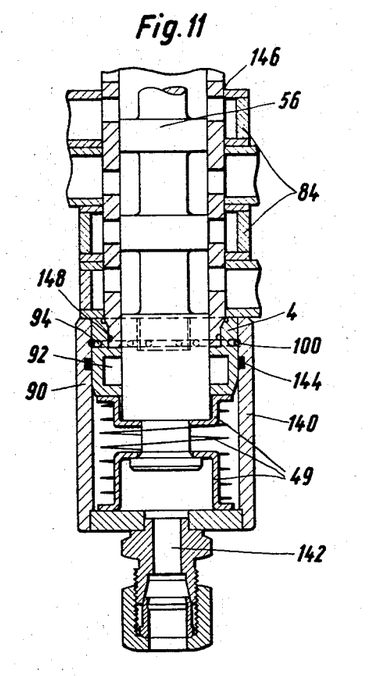
FIG. 11 is another cross-sectional view of a control bushing as used in the valve assembly, this view showing in an enlarged scale greater details and illustrating in particular the actuating mechanism of a control piston arranged in said control bushing.

FIG. 11 shows in greater detail the pot-like spring casing 140 which, as described before, is secured to the cap member 90 by means of spring washer 100. The pot-like casing 140 serves to receive means to hydraulically actuate the control piston and is provided with a pipe or hose connection member 142. By an O-ring 144 the casing 140 is sealed. The lower end of control bushing 146 has a peripheral groove 148 into which a soldering wire may be inserted to secure the annular connecting part 90.

Figure 12:
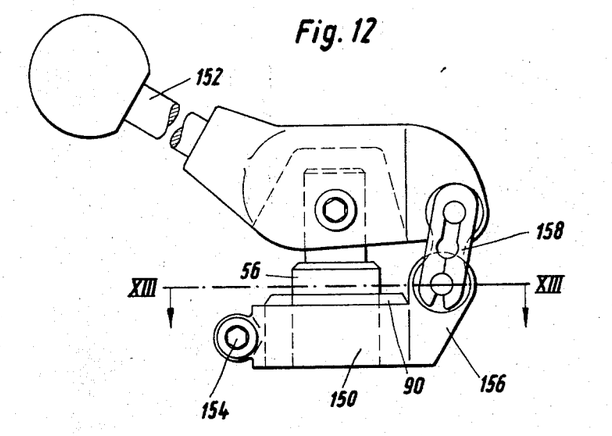
FIG. 12 is a side elevational view of a valve operating handle and an annular clamp to fasten same.
Figure 13:
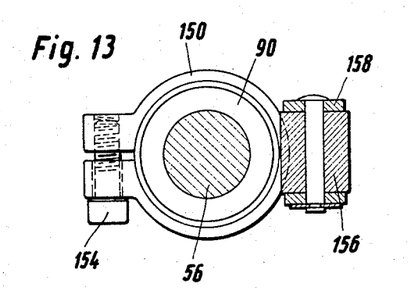
FIG. 13 is a sectional view taken along line XIII—XIII of FIG. 12.

FIG. 12 demonstrates an annular clamp 150 to hold a handle 152 serving to operate the valve piston 56. The clamp 150 is axially slotted as evident from FIG. 13, and can by means of a bolt 154 be clamped to an upper cap member 90.

The clamp 150 is equipped also with an eye 156 by which one end of a linking member 158 is supported the other end of member 158 being articulated to handle 152 so that a linear movement of the piston is possible.

Figures 14, 15:
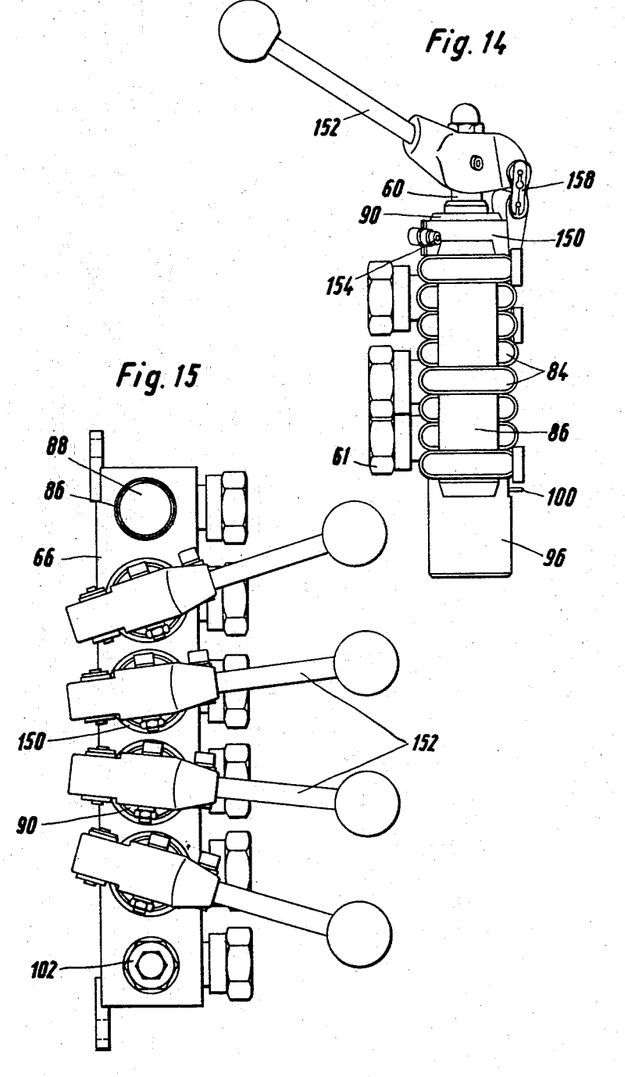
FIG. 14 is an end elevational view of a control valve according to FIG. 6 with an operating handle attached thereto.
FIG. 15 is a top view of a control valve according to FIG. 14 having four operating handles attached thereto.

FIG. 14 shows end elevational view of a valve assembly with an operating handle of FIG. 12 attached thereto. FIG. 15 shows a top view of a valve assembly having four control valves each of which is equipped with an operating handle. The main axes of operating handles 152, as apparent from the drawing, do not extend parallel to each other but include at least a slight angle such that the operating buttons have a comparatively great distance from each other facilitating their operation.

Clamps 150 may also serve to attach electromagnetic means to cap members 90 for actuating the control pistons.

Figure 16:
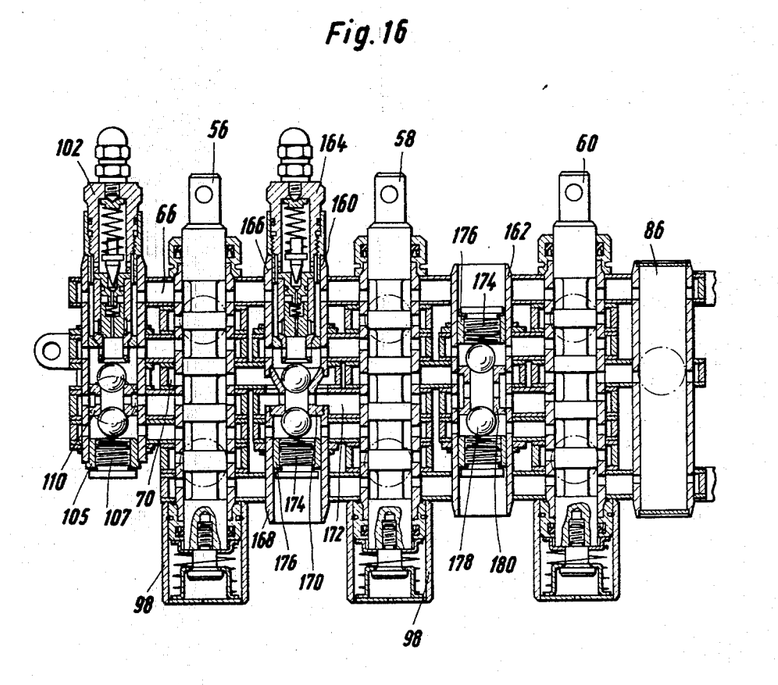
FIG. 16 is a cross-sectional view in longitudinal direction of a further embodiment of a valve assembly according to this invention.

The embodiment of FIG. 16, showing a longitudinal cross-section therethrough, corresponds in its general construction to the valve assembly of FIG. 6; like members therefore are designated by like reference numerals. In the embodiment of FIG. 16, however, additional bushing members 160, 162 are arranged between the control bushings 56–58 and 58–61. These bushing members 160, 162 penetrate the flat tubes and are soldered thereto in the manner as control bushings 56, 58, 61.

In casing 160 a pressure-limiting valve 164 is mounted that makes it possible to operate connected apparatuses or devices controlled by means of control piston 58 or 61 at a lower operating pressure. Bushing member 160 is composed of upper bushing section 166 and lower bushing section 168. Both sections are soldered to a lathe-manufactured member 170 which also constitutes approprite seats for a double-acting check-valve. Member 170 tapers into a waist-like portion thus allowing a flow of the pressurized fluid from tube 70 into tube 172. Special shape of the member 170 makes it possible, despite the small dimensions of this member, to place the check-valve and also to use the same valve type for the pressure limiting valve 164 used for valve 102. The lower bushing section 168 is closed by a plug 174 (107) which is screwed into a threaded ring 176 soldered to the inner wall of bushing section 168.

A check-valve assembly 178 is mounted in bushing 162. The lathe-manufactured valve seat 180 of this valve-assembly 178 has a C-shaped cross section and is soldered into the bushing 162 as valve seat 110 (FIG. 6). The upper and the lower ends of this bushing are likewise closed by plugs 174 which are screwed into threaded rings 176 soldered in the interior of bushing 162.

In order to avoid undesired and objectionable actions of hydraulic driving devices controlled by a valve assembly, frequently so-called shock-valves, check-valves or the like are interconnected into communicating connecting conduits. According to embodiments of a valve assembly of this invention, such additional or auxiliary valves may be formed directly as parts of the valve assembly. Bushing-like casings to receive such auxiliary valves are then mounted to suitable junctions of the valve assembly, as illustrated in detail in FIGS. 17–20.

Figure 17:
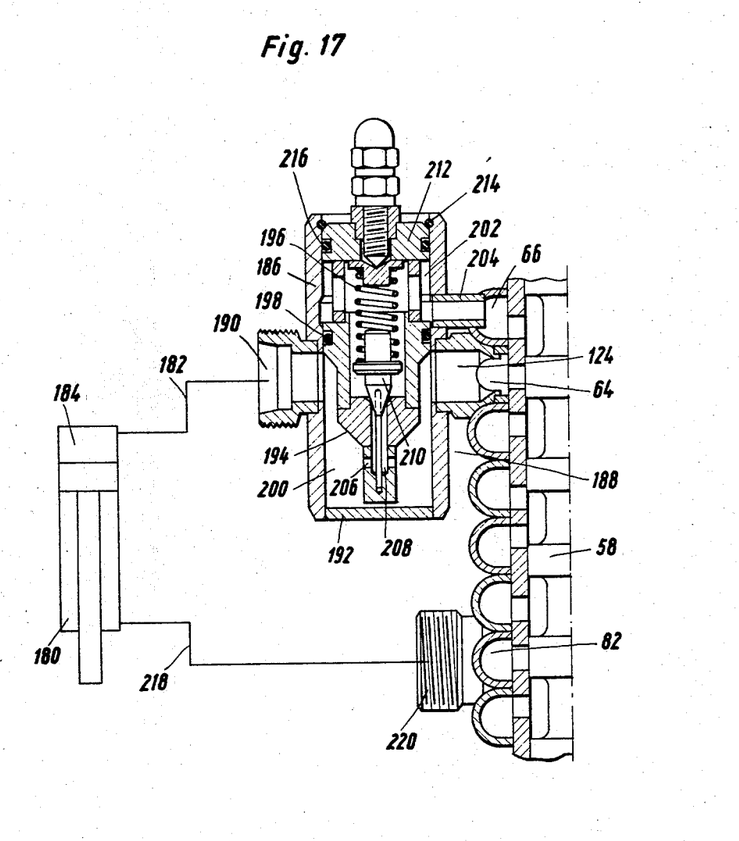
FIG. 17 is a cross-sectional view of a valve bushing schematically illustrating the arrangement of an auxiliary control means for a connected apparatus.

In the embodiment of FIG. 17 a schematically indicated hydraulic driving means including the piston 180 is controlled by the control piston 58. Conduits 182 and 218 connect the driving means to the valve assembly. A so-called shock valve is interconnected into the conduit 182 which leads to the upper end of the device 180, 184. This shock valve is a pressure limiting valve responsive to pressure peaks. It is located in a bushing-like casing 186 which is soldered to the recessed end 188 of the port adapter 119 of the main valve assembly. On the side opposite the port adapter 119, the bushing-like casing 186 is provided with a junction member 190 which also is soldered to bushing 186. The bottom of bushing 186 is closed by a cover 192 soldered into the interior of the bushing 186. The shock-valve inserted into bushing-like casing 186 is constituted by a simple pressure-limiting valve 194 including a spring 196 the biasing of which can be adjusted in a conventional manner. The insert 194 is sealed with respect to the interior bushing wall by an O-ring 198, thus dividing the interior of the bushing-like casing 186 into the pressure chamber 200 and the pressure-free chamber 202. The pressure-free chamber 202 communicates with the outflow channel 66 through a tube 204 the ends of which are soldered to casing 186 and the main valve assembly, respectively. The straight tube 204 can be soldered into a simple bore of casing 186 and of tube 66 since here no pressure does occur.

If the pressure in conduit 182 is increased, for example, because outer forces acting on the piston of the driving means 180, 184 become too great or because the piston when moved under load is stopped too quickly, the pressurized fluid can travel through bores 206, 208, passing the valve cone 210, into the pressure-free chamber 202 and from there through the tube-section 204 into the flat tube 66 of the main valve assembly.

Chamber 202 is closed by a cover 212 bearing against a spring washer 214. An O-ring 216 seals cover 212 with respect to the inner wall of the bushing-casing 186.

It will be understood that likewise a similar valve device may be interconnected into conduit 218 through which the piston rod side of the hydraulic driving means communicates with the main valve assembly. In this case, this further valve device could be secured to the lower port adapter 220 correspondingly and both valves could be enclosed by one common casing divided in the middle by a partition soldered into the casing.

Figure 18:
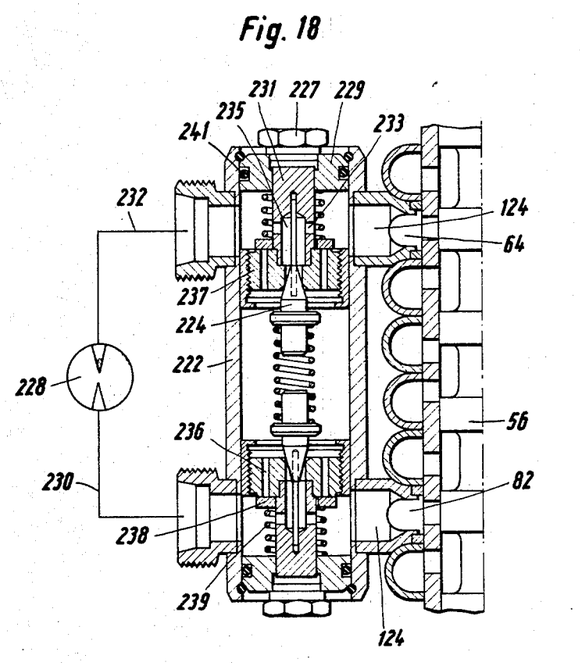
FIG. 18 likewise is a cross-sectional view through a valve bushing depicting another embodiment including an auxiliary control means.

Such a common bushing-like casing 222 is illustrated in FIG. 18. Casing 222 is connected to the main valve assembly in the manner described hereinbefore. The valve assembly located within the bushing 222 comprises two so-called shock valves to protect a hydraulic motor 228 communicating therewith. Motor 228 is fed with pressurized fluid through conduits 230 and 232. The rotor of such a hydraulic motor 228 may continue to rotate under the influence of an outer load despite the fluid supply by means of the control piston 56 has been disconnected, the motor 228 then acting like a pump. In this case a super-pressure would be built up in the one of the two conduits 230, 232 through which the fluid normally returns. In the other conduit through which the fluid is fed to the motor, negative pressure would be created.

Assuming that the motor 228 is stopped extremely fast and due to mass forces an increased pressure obtains in conduit 232, this pressure is transmitted through bores 233, 235 to valve cone 224 so that said valve is opened. After passage of valve cone 224, the oil travels through bores 236 of the opposite valve to the underside of a valve disc 238. Said disc 238 may then be moved against the force of a spring 239 so that the returning oil may enter the motor conduit 230. If the motor 228 rotates in opposite sense the backfeeding of the oil takes place in a corresponding manner into the conduit 232.

The shock valves are adjusted by means of a hexagonal head 227 mounted in the cover member 229. The inner bore of cover member 229 likewise is formed as a hexagon receiving a hexagonally outlined shaft member 231 fitting into said bore. Shaft member 231 is fixedly soldered to valve seat 237 and may be turned by means of said head 227. The O-ring 241 seals the cover member 229 and due to its peripheral friction simultaneously serves as safety means to prevent undesired rotations.

Figure 19:
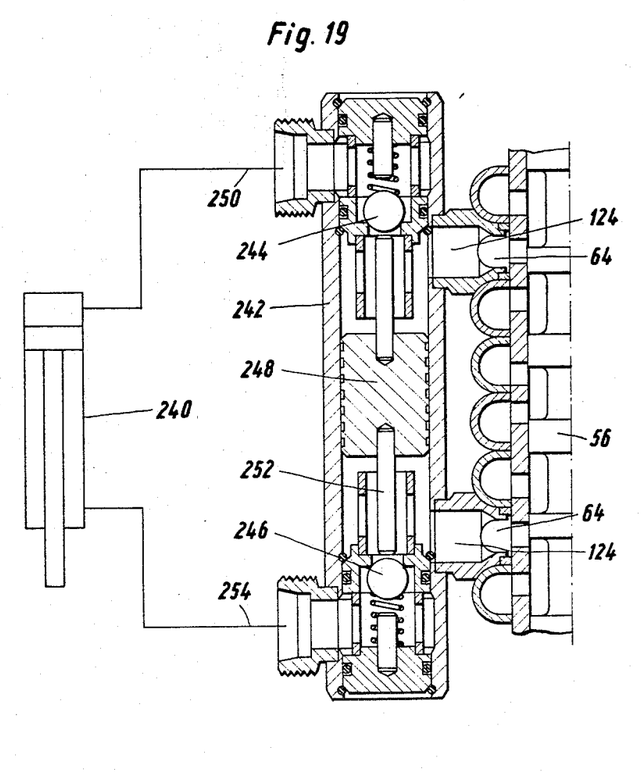
FIGS. 19, 20 and 21 are views of cross-sections through a valve bushing provided with other embodiments of auxiliary control means.

The embodiment illustrated in FIG. 19, involves the problem to hold the piston of a driving means 240 in its position immediately after the shutoff of the valve despite a load acting therein. A control bushing 242 connected to the main valve assembly therefor is provided in the before-described manner with two check valves 244 and 246 which can be unlocked by a slidable piston 248 adapted to be controlled by the pressurized fluid. If, for example, a pressure through the upper junction 124 is exerted to conduit 250 this pressure is also transmitted to the front surface of the piston 248. Piston 248 under the influence of this pressure is moved towards check valve 246 and by means of pin 252 opens this valve so that the pressurized fluid can flow off to conduit 254.

Figure 20:
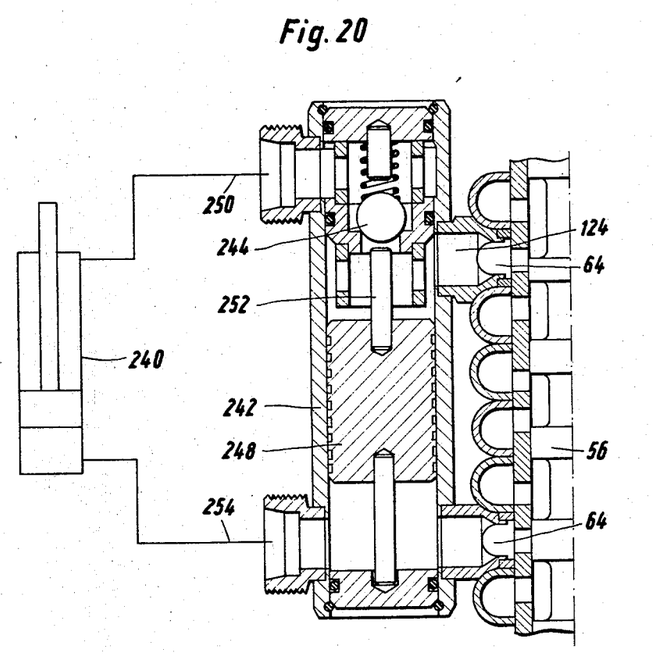

FIG. 20 shows an embodiment similar to the one of FIG. 19. In this embodiment, however, only one check valve is employed to prevent an undesired motion of the piston of driving means 240 towards the piston-rod end of means 240.

Figure 21:
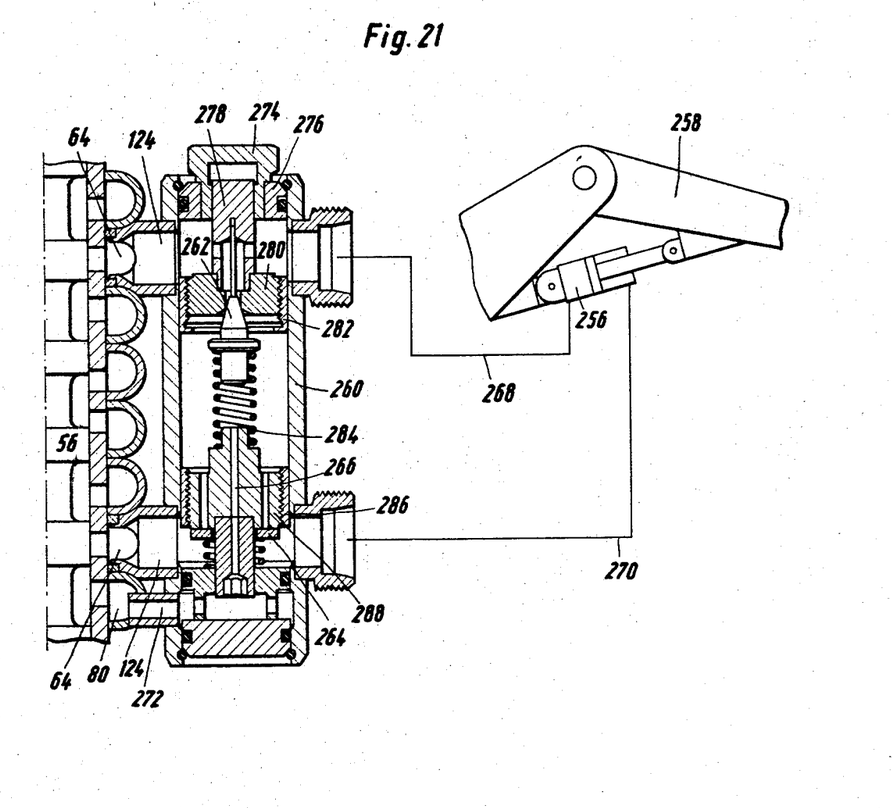

The embodiment of FIG. 21 relates to the problem to guarantee that the allowable maximum torque applied to a pivotally mounted lever 258 by a hydraulic driving means 256 is not exceeded. For this purpose, an assembly comprising an excess pressure valve 262, a check valve 264 and a throttle-like draining passage 266 is provided within a bushing-like casing 260 which is attached to the main valve assembly. As soon as the torque acting on the lever 258 exceeds the predetermined limit, oil is pushed back through conduit 268 and through pressure limiting valve 262 from the left end of the hydraulic driving means 256. This oil may flow to the piston rod side of the means 256 through check valve 264 and conduit 270. The excess oil due to the difference between the volumes flows through the throttle-like passage 266 and a connecting tube 272 into the oil back-feeding tube 80.

The bias of the pressure-limiting valve 262 is adjustable by means of a head 274 inserted into cover member 276. A trunnion 278 is received in the head 274 in a non-rotatable manner but axially movably in relationship thereto and is connected to valve seat 280. Valve seat 280 is screwed into a threaded ring 282 soldered into the interior of the bushing-like casing 260. In rotating the cover member 276, the height of the position of the valve seat 280 with respect to the threaded ring 282 is changed, and thus the bias of spring 284 is adjusted. A preadjustment can also be effected by means of a valve seat 288 of check valve 264, this seat 288 being screwed into a threaded ring 286 soldered into the bushing-like casing 260.

Furthermore auxiliary means like valves to control the speed of a driving device independent from the applied pressure may be associated with the main valve assembly.

Figure 22:
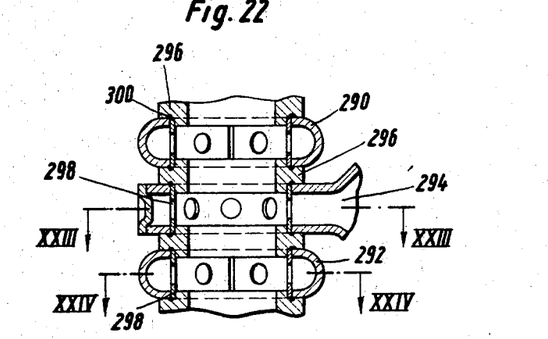
FIG. 22 is a view of a cross-section in detail through one embodiment of a casing according to this invention having separate ring-like bushing members rather than one continuous control bushing.
Figure 23:
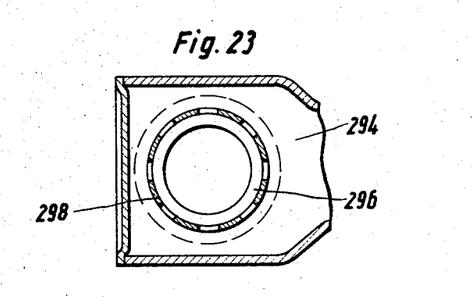
FIG. 23 is a cross-sectional view taken along the line XXIII—XXIII of FIG. 22.
Figure 24:
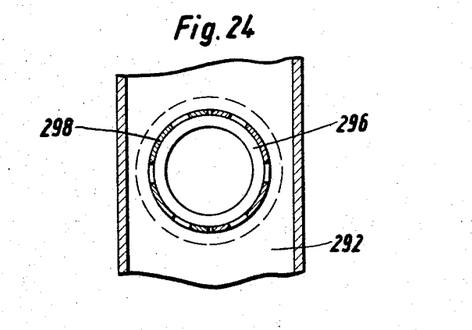
FIG. 24 is a cross-sectional view taken along the line XXIV—XXIV of FIG. 22.

FIG. 22 shows a sectional view of a slightly modified embodiment of this invention using individual rings 296 which are located between the flat tubes 290, 292 and 294 as well as between subsequent tubes rather than a continuous control bushing, these rings forming guiding walls for the (not shown) control piston. The rings 296 have a T-shaped cross section with an outwardly directed stem. Between adjacent rings 296 perforated distance or holding rings 298 are arranged to receive forces acting in longitudinal direction. These rings 298 are enclosed by the tubes 290, 292 and 294. The perforated rings 298 may, as illustrated in FIG. 23, be formed in one piece, or they may, as shown in FIG. 24 be composed of two or more segments. They may be provided with grooves 300 to receive a soldering wire.

As apparent from the drawing, the tubes of this embodiment are not in contact with each other. Pressure acting on these tubes in this case can be transmitted by fitting metal sheets positioned in spaces left between adjacent tubes. Likewise, in the before-described embodiments having continuous control bushings, the tubes could be spaced from each other and spacing strips could be mounted between the individual tubes to support the same.

A control valve casing according to this invention has preferably a structure such as to provide for equal distances between the apertures of the flat tubes receiving the penetrating control bushings. In this case, predrilled flat tubes can be used and tube sections having the required length can be separated therefrom in the middle between subsequent apertures. It is then possible to build valve assemblies of any desired construction using only a few types of basic components for the tube sections, the control bushings, the inlet—and outlet—bushings, port adapters, fittings, etc.

In view of this it is also possible to produce special constructions of a low piece number without causing additional expenses.

Besides the before-mentioned parts, substantially only simple lathe-manufactured pieces are required needing as a special treatment only a radial drilling. All the individual parts may be prefabricated and prepared to such a degree that after the soldering process has been performed only a microfinish of the racing faces of the control bushings is necessary. In addition to the before-mentioned advantageous features, a valve assembly according to this invention is characterized by comparatively great flow cross sections and smooth inner walls causing only relatively little pressure losses.

What we claim is:

1. A valve assembly comprising control bushings including control pistons, tubes interconnecting said control bushings, said tubes having at least two flat walls extending parallel to each other, said flat walls being provided with apertures the main axes of which extend substantially perpendicularly to the surfaces of said flat walls, flat walls of neighboring tubes extending in parallel relationship to each other, said control bushings penetrating through said apertures of said tubes and being soldered to said tubes.

2. A valve assembly according to claim 1, comprising furthermore at least one fitting, at least one of said flat tubes having at one end an enlarged diameter, said fitting being inserted into said end of enlarged diameter and being soldered thereto.

3. A valve assembly according to claim 1, wherein the main axes of flat tubes adapted to be connected to an apparatus controlled by said valve assembly extend in a direction substantially rectangular to the main axes of remaining flat tubes, said rectangular extending tubes having an enlarged diameter at their ends, fittings being inserted into said ends of enlarged diameter and being soldered thereto.

4. A valve assembly according to claim 1, comprising furthermore plates, said plates being inserted into the open ends of said flat tubes and being soldered thereto.

5. A valve assembly according to claim 1, comprising furthermore a tubelike manifold extending parallel to said control bushings, said manifold being inserted into apertures provided in flat walls of tubes for feeding back a fluid controlled by said assembly, in a manner communicating with the ends of said back-feeding tubes, said manifold being soldered to said back-feeding tubes.

6. A valve assembly according to claim 5, wherein the ends of said manifold are inserted in apertures provided only in one wall each of said back-feeding tubes.

7. A valve assembly according to claim 1, comprising furthermore supporting members, said supporting members embracing said control bushings and contacting flat walls of said flat tubes in order to support said flat tubes, said supporting members being soldered to said control bushings.

8. A valve assembly according to claim 7, comprising furthermore tube-like spacing members, said spacing members embracing said control bushings and being arranged between opposite supporting members.

9. A valve assembly according to claim 1, wherein all of said flat tubes extend in the same direction, such of said tubes adapted to be connected with an apparatus controlled by said valve assembly being provided with bores, said bores being provided in sidewalls of said tubes extending between said flat walls, port adapters being inserted into said bores and being soldered thereto.

10. A valve assembly according to claim 9, comprising furthermore auxiliary bushing-like casings soldered to two superposed port adapters and adapted to receive valve means to be interconnected.

11. A valve assembly according to claim 10, wherein additional conduits are provided connecting said bushing-like casings to such of said flat tubes feeding back a fluid controlled by said assembly.

12. A valve assembly according to claim 9, wherein said port adapters are provided with a cylindrical bore and a conical bore, said cylindrical bore terminating in said conical bore, the port-side end of said adapter having a central recess extending radially over the entire cross section of said adapter, said recess being defined by a curved bottom, said recess intersecting said conical bore and partly intersecting said cylindrical bore, width of said recess being somewhat less than the distance between the inner surfaces of two opposite flat walls of one of said tubes.

13. A valve assembly according to claim 12, wherein the side walls of said flat tubes are of semi-circular shape and the port-side ends of said port adapters are provided with a pair of lateral curved recesses, the curvature of said lateral recesses corresponding to the curvature of said semi-circular-like shaped sidewalls of said flat tubes.

14. A valve assembly according to claim 12, wherein said port adapter is provided with two shoulders extending parallel to said central recess, the width of each of said shoulders corresponding to the thickness of said flat walls of said flat tubes.

References Cited by the Applicant

UNITED STATES PATENTS

| | | |
|---|---|---|
| 465,611 | 12/1891 | Matthews. |
| 2,453,413 | 11/1948 | De Frees. |
| 2,834,368 | 5/1958 | Gray. |
| 2,856,960 | 10/1958 | Stacey. |
| 2,924,240 | 2/1960 | Dolan. |
| 2,982,306 | 5/1961 | Fitzgibbon. |
| 2,994,346 | 8/1961 | Ruhl. |
| 3,093,116 | 6/1963 | Rood. |

FOREIGN PATENTS 178,098   2/1962   Sweden.

M. CARY NELSON, *Primary Examiner.*

H. KLINKSIEK, *Examiner.*